(12) United States Patent
Saka et al.

(10) Patent No.: US 6,590,521 B1
(45) Date of Patent: Jul. 8, 2003

(54) OBJECT RECOGNITION SYSTEM

(75) Inventors: Masakazu Saka, Wako (JP); Shigeru Inoue, Wako (JP); Hisaya Izawa, Wako (JP); Tomoyoshi Aoki, Wako (JP)

(73) Assignee: Honda Giken Gokyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/691,614

(22) Filed: Oct. 18, 2000

(30) Foreign Application Priority Data

Nov. 4, 1999 (JP) .......................................... 11-314332

(51) Int. Cl.$^7$ .......................... G01S 13/93; G01S 13/86
(52) U.S. Cl. ............................ 342/70; 342/52; 342/54; 342/55; 342/71; 356/4.01; 356/5.01; 701/300; 701/301; 180/167; 180/169
(58) Field of Search .......................... 342/70, 71, 72, 342/89, 90, 175, 192–197, 52–59; 340/901, 902, 903; 701/23, 24–28, 300, 301, 302; 356/4.01, 5.01, 5.02–5.15

(56) References Cited

U.S. PATENT DOCUMENTS 5,617,085 A * 4/1997 Tsutsumi et al. ........... 340/903
6,138,062 A * 10/2000 Usami ......................... 701/23
6,191,704 B1 * 2/2001 Takenaga et al. ........... 340/903

FOREIGN PATENT DOCUMENTS

| EP | 0697641 A2 | * | 2/1996 | ............ G05D/1/00 |
| JP | 4-193641 A | | 7/1992 | |
| JP | 4-248489 A | * | 9/1992 | ............ G01S/13/93 |
| JP | 7-333342 A | * | 12/1995 | ............ G01S/17/93 |
| JP | 9-142236 A | * | 6/1997 | ............ B60R/21/00 |
| JP | 9-178855 A | * | 7/1997 | ............ G01S/17/93 |
| JP | 10-68777 A | * | 3/1998 | ............ G01S/17/93 |

* cited by examiner

*Primary Examiner*—Bernarr E. Gregory
(74) *Attorney, Agent, or Firm*—Lahive & Cockfield, LLP

(57) ABSTRACT

An object recognition system including a radar, an image sensor and a controller is provided. The radar determines the position of an object, and the image sensor captures an image of the object. The controller sets a processing area within the image captured by the image sensor based on the position of the object determined by the radar and a predetermined size for the object to be recognized. The controller extracts horizontal and vertical edges from the processing area, and preferably judges whether each of the extracted edges belongs to the object based on characteristics of the object to be recognized. The controller then recognizes the outline of the object based on the edges judged to belong to the object. The object can be recognized by determining upper, lower, left and right ends of the object. On the other hand, the controller recognizes lane lines defining the lane in which the vehicle mounting the system of the invention is running. Thus, the relative position of the object to the lane lines is determined by comparing the intersections between a horizontal line corresponding to the lower end of the object and the lane lines with the left and right ends of the object.

20 Claims, 19 Drawing Sheets

Fig. 7

| −1 | −1 | −1 |
|---|---|---|
| 2 | 2 | 2 |
| −1 | −1 | −1 |

(a)

$F(i\ j) =$

| F(−1,−1) | F(0,1−1) | F(1,−1) |
|---|---|---|
| F(−1,0) | F(0,0) | F(1,0) |
| F(−1,1) | F(0,+1) | F(1,1) |

(b)

Fig. 9
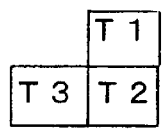
(a)
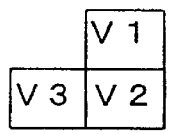
(b)
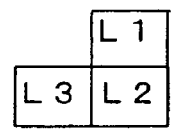
(c)
(d)
| | Conditions | Results | |
|---|---|---|---|
| | | Label L2 | Combined Labels |
| 1 | V1≠V2, V3≠V2 | L | |
| 2 | V1≠V2, V3=V2 | L3 | |
| 3 | V1=V2, V3≠V2 | L1 | |
| 4 | V1=V2, V3=V2, L1=L3 | L1 | |
| 5 | V1=V2, V3=V2, L1≠L3 | L1 | (L1, L3) |
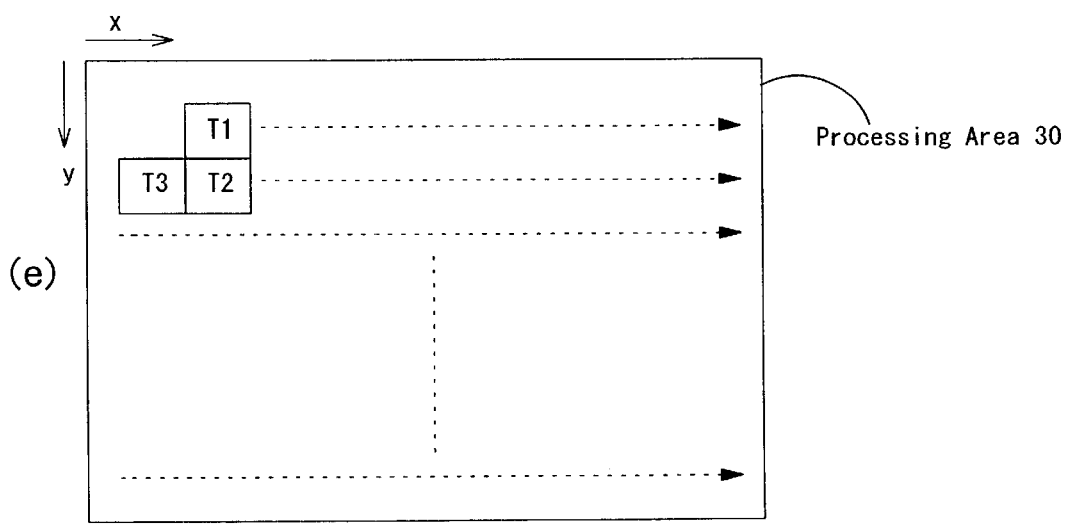
(e)

| -1 | 2 | -1 |
|---|---|---|
| -1 | 2 | -1 |
| -1 | 2 | -1 |

Fig. 12
(a) 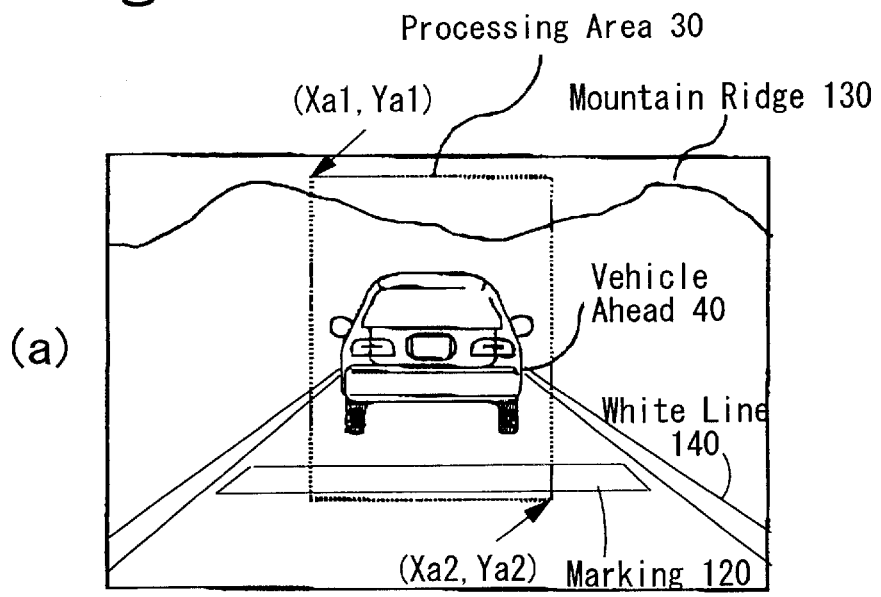
(b) 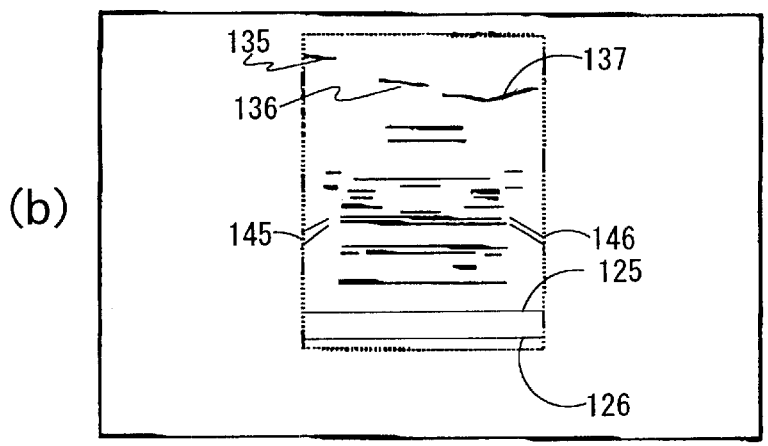
(c) 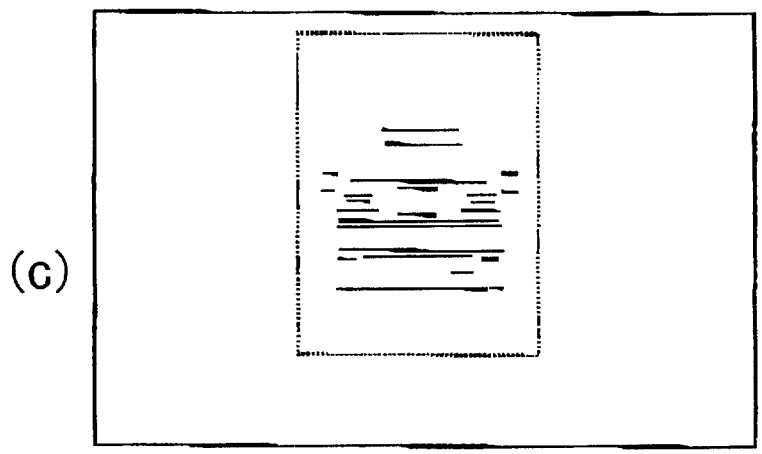

Fig. 19
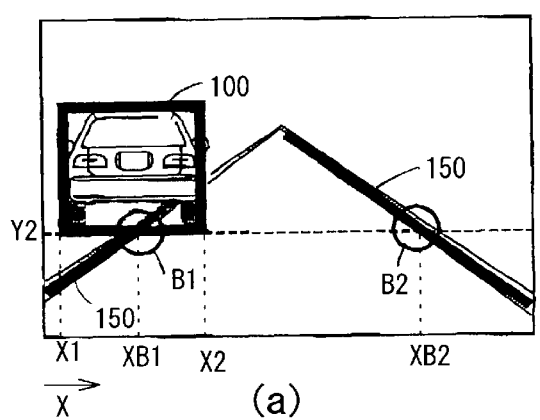
(a)
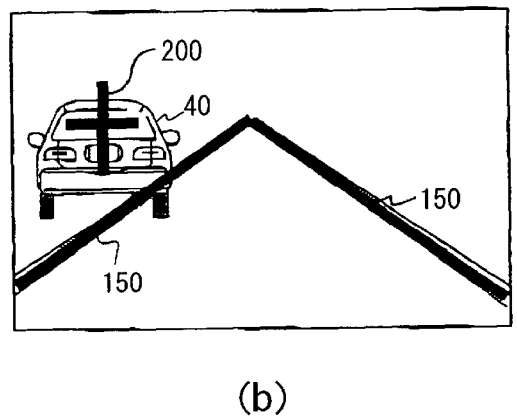
(b)

OBJECT RECOGNITION SYSTEM

FIELD OF THE INVENTION

The present invention relates to an object recognition system which is mounted on a vehicle and determines the relative position of an object ahead of the vehicle, and more particularly to an object recognition system determines the relative position of a vehicle ahead to the vehicle mounting the system.

BACKGROUND OF THE INVENTION

In recent years, devices which determine the distance and size of an object in front of a vehicle, and which appropriately control the vehicle in accordance with this determination, have been proposed for improving the safety of vehicle operation. A typical method for obtaining information about the object ahead includes the steps of: extracting horizontal edges and vertical edges from captured image; determining whether each of the extracted edges belongs to the object such as a vehicle ahead; and recognizing the object based on the edges determined to belong to the object.

Japanese Patent Application Kokai No. Hei 4-193641 describes an apparatus for determining whether an object existing ahead in the lane of the vehicle mounting the apparatus is an obstacle. The determination is performed according to a guide signal indicating a white line or a state of the road extracted from a captured image by a video camera, and a measurement signal indicating the position of the object measured by a radar apparatus.

Japanese Patent Application Kokai No. Hei 9-178855 describes a method for detecting an obstacle located in the same lane as a vehicle. According to the method, the lane of the vehicle is detected from an image captured by an image sensor, and the position of the obstacle is identified by a radar apparatus. The position of the obstacle is compared with the position of the lane to determine whether the obstacle is located in the same lane as the vehicle.

Furthermore, Japanese Patent Application Kokai No. Hei 10-68777describes an apparatus for detecting the vehicle ahead based on the data indicating the shape of the road derived from an image captured by a camera, and a position signal indicating the position of the vehicle ahead output by a radar apparatus.

However, according to the above conventional methods, the outline or size of an object cannot be recognized correctly because the radar device such as laser type radar only detects he position of the object from a reflective wave from a reflector attached to the object. When the object exists very close to the line defining the lane of the vehicle mounting the radar, the position (direction) of the object can be obtained, but its size cannot be correctly obtained. Accordingly, it is actually difficult to determine whether the object is completely outside the lane of the vehicle, or a part of the object is within the lane of the vehicle. Furthermore, although an object is actually within the lane of the vehicle, it may be erroneously recognized as outside the lane of the vehicle. In addition, when the object enters the lane of the vehicle, or when the object gets out of the lane, the timing of these behaviors of the object cannot be correctly detected because the correct size of the object cannot be obtained.

Accordingly, one object of the present invention is to provide a system, which makes it possible to determine the relative position of an object to the lane of the vehicle based on the size of the object as well as the position of the object.

SUMMARY OF THE INVENTION

According to one aspect of the invention, an object recognition system including a radar, an image sensor, and a controller is provided. The radar determines the position of an object, and the image sensor captures an image of the object. The controller sets a processing area within the image captured by the image sensor based on the position of the object determined by the radar and a predetermined size for the object to be recognized. It is preferable that the predetermined size is set to surround the object to be recognized.

The controller extracts edges from the processing area. Extraction of edges can be implemented by detecting a variation of intensity values of pixels contained in the processing area. The edges can comprise horizontal and vertical edges. The controller then recognizes the outline of the object based on the extracted horizontal and vertical edges.

The controller also recognizes lane lines defining the lane in which the vehicle mounting the system of the invention is running. Thus, the relative position of the object to the lane lines is determined based on the recognized outline of the object and the recognized lane lines.

According to one aspect of the invention, the outline of the object can be recognized by determining upper, lower, left, and right ends of the object. Thus, the relative position is determined by comparing the intersections between a horizontal line corresponding to the lower end of the object and the lane lines with the left and right ends of the object. For convenience, the lane lines as well as the ends of the object may be represented by x and y coordinates.

It is preferable that the controller judges whether each of the extracted edges indicates or belongs to the object based on characteristics of the object to be recognized for removing the edges belonging to an object other than the object to be recognized.

According to another aspect of the invention, the upper and lower ends are determined from the horizontal edges, and the left and right ends are determined from the vertical edges.

According to another aspect of the invention, the lane lines are determined by detecting a road area in the captured image. More particularly, intensity values of pixels immediately in front of the vehicle are examined to extract one or more intensity reference values representing the road. Intensity values of pixels within the image are compared with the intensity reference values to detect pixels belonging to the road area. Thus, the road area is detected, and hence the lane lines partitioning the road area are detected.

The controller can comprise a micro-controller which typically includes a central unit (CPU), or a micro-processor, a read-only memory (ROM) containing control programs that when executed by the processor performs respective functions which are to be described hereafter. The controller also includes a random-access memory (RAM) that provides a working area for the CPU and temporary storage for various data and programs.

BRIEF DESCRIPTION OF THE DRAWINGS

FIG. 7(A) is a diagram showing the filter for extracting horizontal edges, and FIG. 7(B) is a diagram showing the coordinates of filter elements.

FIGS. 9a through 9e are a diagram illustrating the template and method of determining labels used in accordance with one embodiment of the present invention.

FIGS. 10a through 10c are a diagram illustrating labeling scheme in accordance with one embodiment of the present invention.

FIG. 11 is a diagram showing the filter for vertical edges.

FIGS. 12a through 12c are a diagram showing the scheme for determining horizontal edges in accordance with one embodiment of the present invention.

FIG. 19(A) shows one example of the relative position of the object to the lane lines of the vehicle in accordance with one embodiment of the invention, and FIG. 19(B) shows the relative position in accordance with a conventional method.

DESCRIPTION OF THE PREFERRED EMBODIMENTS

Figure 1:
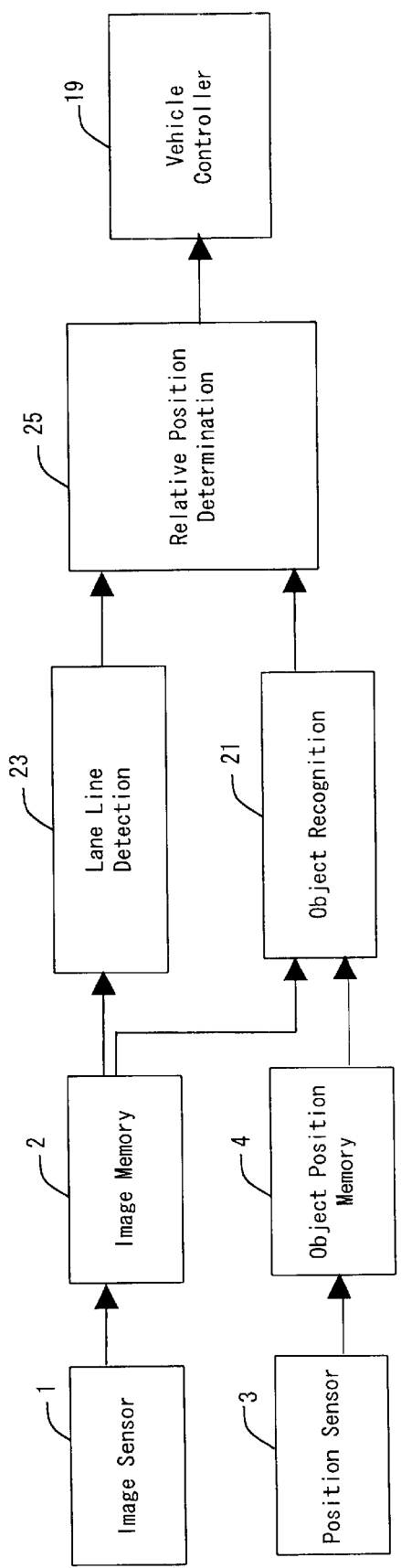
FIG. 1 is a block diagram illustrating the overall structure, and functional blocks of the controller of one embodiment of the present invention.

The embodiments of the present invention will be described below with reference to the attached drawings. FIG. 1 is an overall block diagram of an object recognition system in accordance with one embodiment of the present invention. Other than the image sensor 1 and the object position sensor 3, all the blocks in FIG. 1 may be incorporated in a controller which comprises a single chip or multiple chip semiconductor integrated circuit. Thus, FIG. 1 shows functional blocks of the controller. Respective functions of the blocks are performed by executing respective programs stored in the ROM of the controller.

In the present embodiment discussed below, it is assumed that an object to be recognized by the object recognition system is a vehicle ahead that traveling ahead of the vehicle mounting the system of the invention.

The image sensor 1 shown in FIG. 1 captures a view ahead of the vehicle mounting the system of the invention. The image sensor 1 is typically two-dimensional CCDs, and can be two-dimensional photo-sensor arrays. When usage in the night is considered, an image sensor using infrared light is advisable. In this case, it is preferable to install infrared-transparent filters in front of a lens, and to design the system such that the object is illuminated at a predetermined period from an infrared light source. The image sensor senses the infrared light reflected from the object. The image captured by the image sensor 1 is converted into digital data by an analog-to-digital converter (not shown), and is stored in an image memory 2.

An object position sensor 3 is typically implemented by laser radar or millimeter-wave radar. The position sensor 3 radiates laser or millimeter-wave to the object and receives the signal reflected by the object to measure the distance from the vehicle mounting the system of the invention to the object as well as the relative direction of the object to the vehicle. The position sensor 3 may be a scan-type radar apparatus with a single beam for scanning over a certain angle range ahead of the vehicle mounting the system of the invention. Alternatively, the scan-type radar with a plurality of beams may also be used. The angle range covered by beams of the radar is set based on the range in which the object to be recognized can be captured by the image sensor 1. In this embodiment, since the object to be recognized is the vehicle ahead, the radar is set to cover at least the lane of the vehicle mounting the system of the invention. Alternatively, the direction of the beams of the radar may be changed as appropriate according to the position of the vehicle ahead obtained in a previous recognition cycle such that the beams are correctly radiated to the vehicle ahead. Thus, the distance D and the direction θ of the vehicle ahead are determined and then stored in an object position memory 4 shown in FIG. 1.

An object recognition part 21 shown in FIG. 1 sets a processing area within the image captured by the image sensor 1, and recognizes the vehicle ahead using edges extracted from the processing area. The process of recognizing the object is repeatedly executed at predetermined time intervals (for example, 100 milliseconds). Described below in detail is the method for recognizing the object implemented by the object recognition part 21, with reference to FIG. 2 showing the object recognition part 21 in detail.

Setting Processing Area

Figure 2:
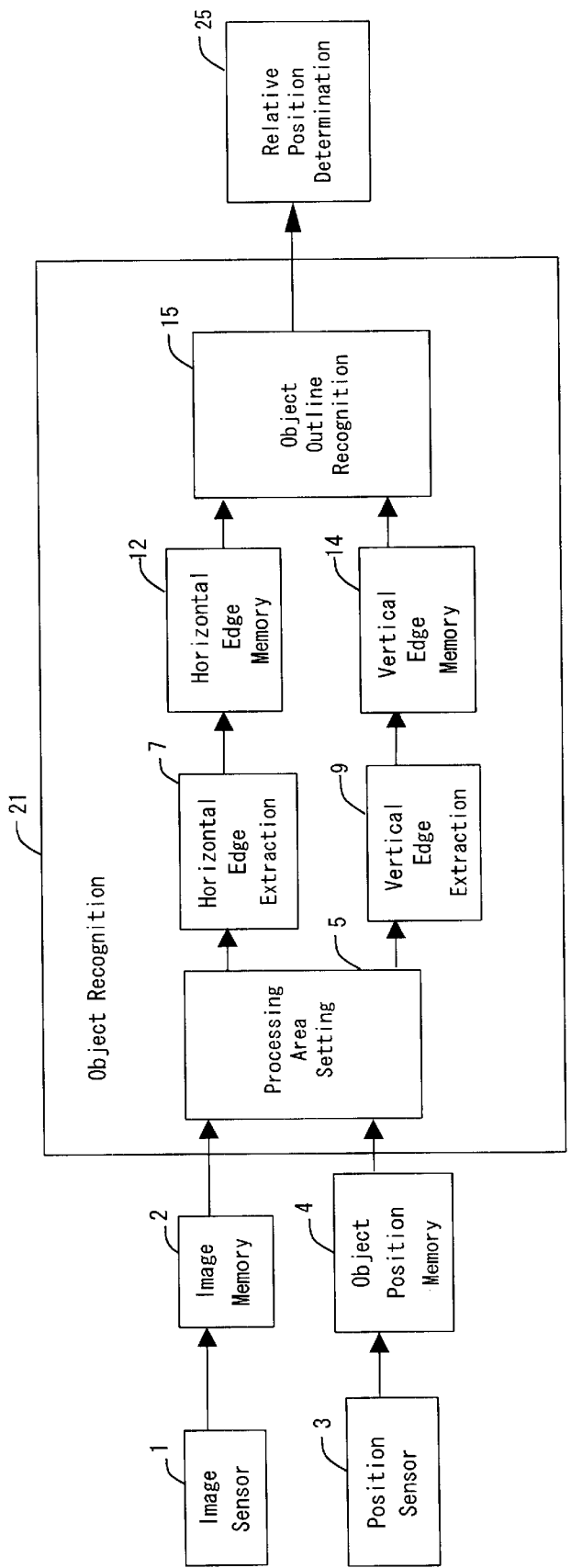
FIG. 2 is a block diagram illustrating in detail the object recognition part in accordance with one embodiment of the present invention.

A processing area setting part 5 shown in FIG. 2 sets processing area within the image captured and stored in the image memory 2 based on the position of the object stored in the object position memory 4 and a predetermined size for the object to be recognized. The predetermined size for the object to be recognized is set beforehand to surround the object to be recognized.

Figure 3:
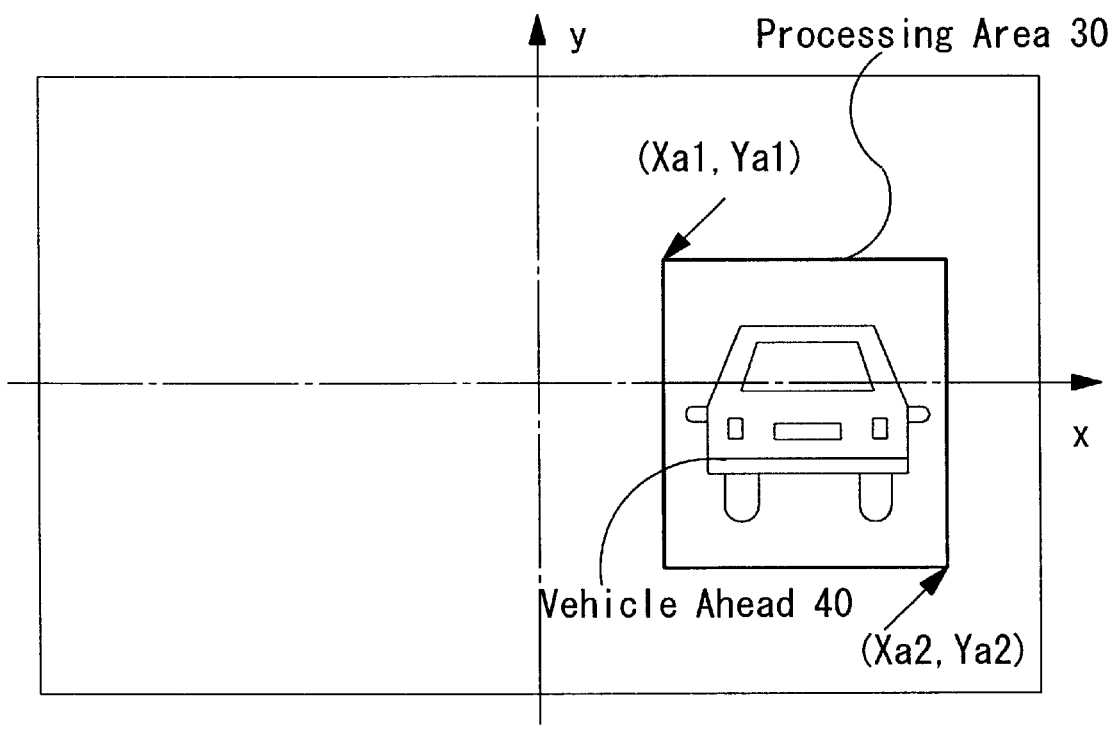
FIG. 3 is a diagram showing the processing area in accordance with one embodiment of the present invention.

The process of setting the processing area is described below by referring to FIGS. 3, 4a, and 4b. FIG. 3 shows an example of the captured image in which the vehicle ahead 40 running forward is included. As shown in FIG. 3, an x-axis and a y-axis are fixed in the image, and a processing area 30 is defined by the coordinates (Xa1, Ya1) and (Xa2, Ya2).

Figure 4:
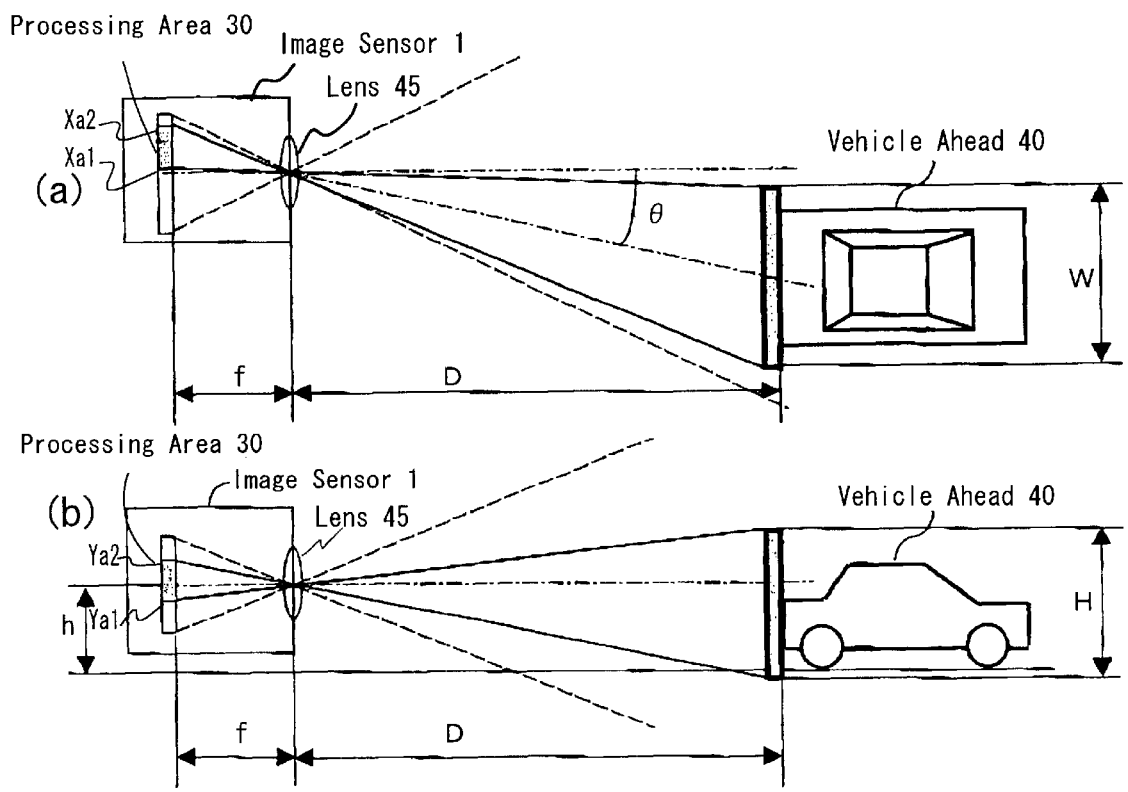
FIGS. 4a and 4b are a diagram showing the way for setting a processing area in accordance with one embodiment of the present invention.

FIGS. 4a and 4b show the way for setting the processing area 30. FIG. 4(A) shows the way for determining the x coordinates, that is, Xa1 and Xa2, and FIG. 4(B) shows the way for determining the y coordinates, that is, Ya1 and Ya2.

In FIGS. 4a and 4b, the image sensor 1 is mounted on the vehicle mounting the system of the invention. The image sensor 1 captures the vehicle ahead 40 that is traveling in front of the vehicle mounting the system of the invention. Reference character f denotes the focal length of the lens 45 mounted on the image sensor 1, which is specified depending on the characteristic of the lens. Reference characters W and H denote predetermined width and height for the object to be recognized, that is, the vehicle ahead in the present embodiment, respectively. The width and height are preset to surround the object to be recognized. For example, for the vehicle ahead, W may be set to 2 m, and H may be set to 2.5 m. Reference characters D and θ denote the distance to the vehicle ahead and the relative direction of the vehicle ahead stored in the object position memory 4 respectively. Reference character h denotes the height from the road to the center of the lens 45, which is predefined depending on the position of the image sensor 1 in the vehicle mounting the system of the invention.

The processing area setting part 5 extracts D and θ stored in the object position memory 4 to compute the coordinates (Xa1, Ya1) and (Xa2, Ya2) using the predetermined parameters W, H, and h as follows.

$$Xa1 = (D \times \tan\theta - (W/2)) \times (f/D) \quad (1)$$

$$Xa2 = (D \times \tan\theta + (W/2)) \times (f/D) \quad (2)$$

$$Ya1 = (H-h) \times (f/D) \quad (3)$$

$$Ya2 = -(h \times (f/D)) \quad (4)$$

In one embodiment, for Ya1 and Ya2, a pitching allowance value "α" is used in consideration of pitching of the vehicle mounting the system of the invention.

$$Ya1 = (H-h) \times (f/D) + \alpha \quad (5)$$

$$Ya2 = (h \times (f/D) + \alpha) \quad (6)$$

Figure 5:
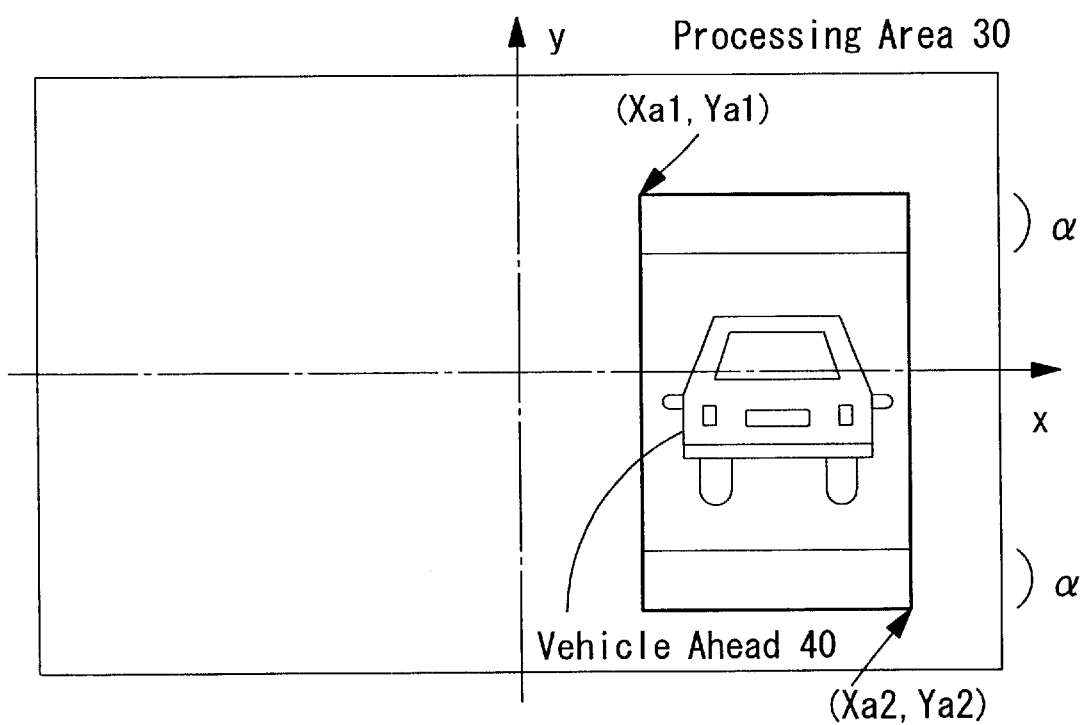
FIG. 5 is a diagram showing another processing area with allowance for pitching in accordance with one embodiment of the present invention.

Thus, the processing area 30 is defined within the captured image by the coordinates (Xa1, Ya1) and (Xa2, Ya2) as shown in FIG. 3, or is defined as shown in FIG. 5 with the pitching taken into account.

Extracting Horizontal and Vertical Edges

Figure 6:
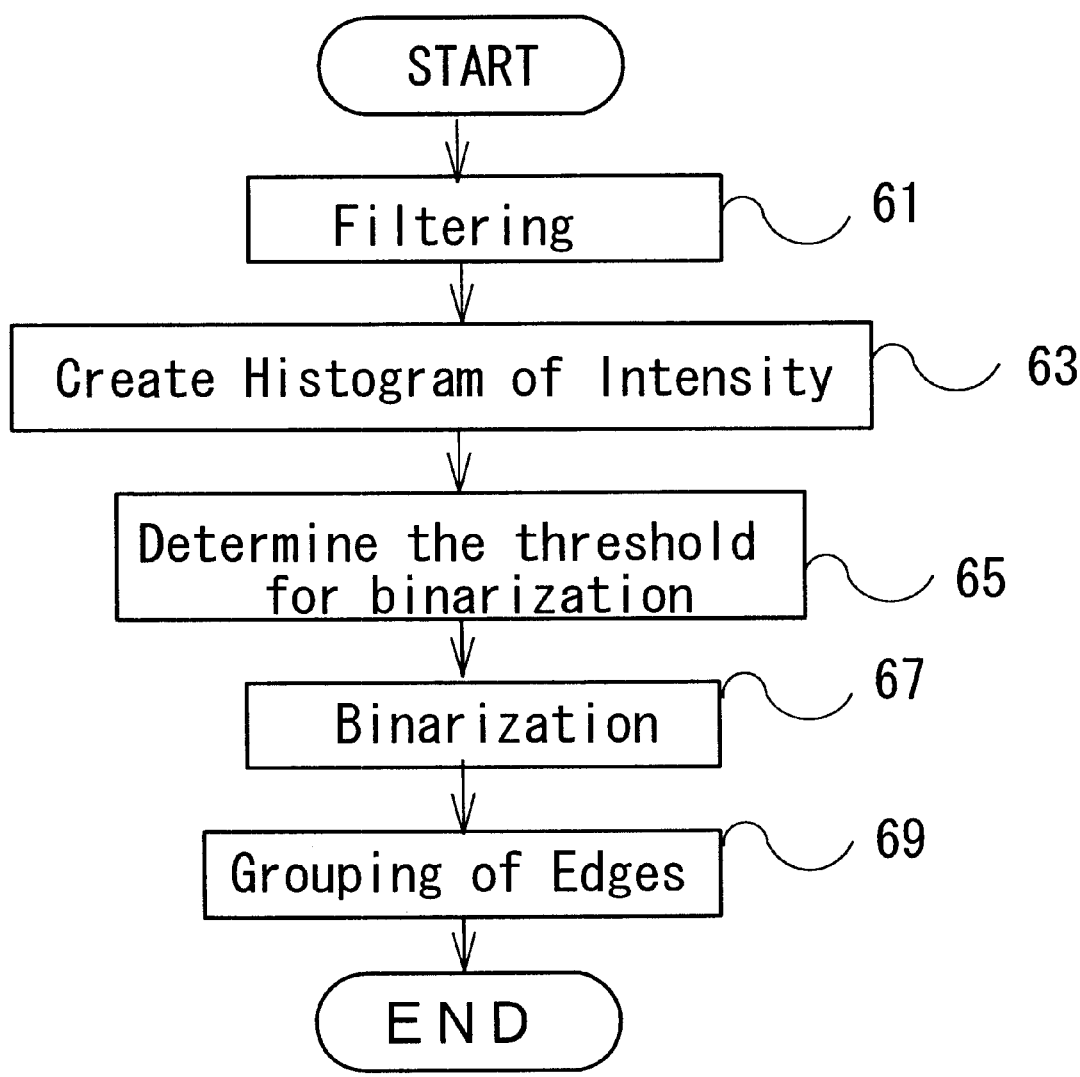
FIG. 6 is a flowchart of the method for extracting edges.

A horizontal edge extraction part 7 and a vertical edge extraction part 9 shown in FIG. 2 extract horizontal edges and vertical edges respectively from the processing area 30. Since both horizontal and vertical edges are extracted in the same way, only the process of extracting horizontal edges is described below. The extracted edges show a portion in which the variation of intensity is large in the image. FIG. 6 is a flowchart of extracting edges, which is carried out by the horizontal edge extraction part 7.

First, the horizontal edge extraction part 7 performs a filtering process on each pixel within the processing area 30 in the horizontal direction to enhance edge portions indicating a large difference in intensity in the horizontal direction (step 61). FIG. 7(A) shows an example of a horizontal edge filter. For convenience in the following computation, coordinates are assigned to each element of the filter as shown in FIG. 7(B).

A computation shown in the equation (7) is executed for the intensity value of each pixel within the processing area 30 while the processing area 30 is scanned by the horizontal edge filter.

$$P(x, y) = \sum_{i=-1}^{1} \sum_{j=-1}^{1} \{F(i, j) \times G(x+i, y+j)\} \quad (7)$$

In equation (7), x and y are coordinates identifying the position of each of pixels in the processing area 30. G(x, y) indicates the intensity value of the pixel at (x, y), and F(i, j) indicates the value of the filter element at (i, j) of the horizontal edge filter. P(x, y) indicates the intensity value of the pixel at (x, y) after the filtering process has been performed. Since values of elements of the horizontal edge filter are predetermined such that horizontal edges are enhanced, horizontal edges can be detected by performing the above computation on each pixel.

In another embodiment, instead of the equation (7), the filtering process is carried out by differentiation. In this case, the difference in intensity between vertically adjacent pixels is calculated as shown in equation (8), where n is an integer, for example, may be set to 1 (n=1).

$$P(x, y) = G(x, y-n) - G(x, y+n) \quad (8)$$

Figure 8:
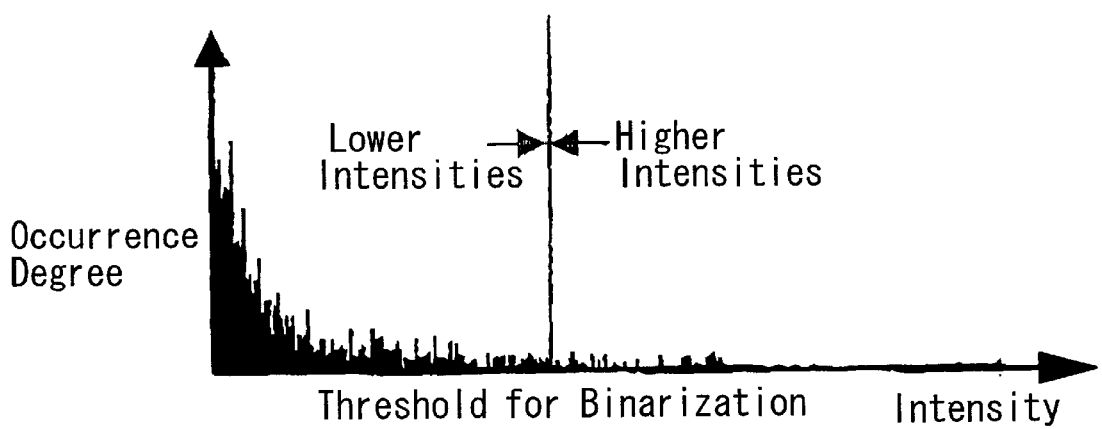
FIG. 8 is a histogram showing intensity values of the captured image.

Then, an intensity histogram is created based on the intensity value P of each pixel (step 63). The intensity value used in this embodiment is represented as digital data having 256 gradations (ranging from pure black "0" to pure white "255") FIG. 8 shows an example of the intensity histogram. The horizontal axis indicates the intensity values obtained in the filtering process while the vertical axis indicates the number of pixels corresponding to each of the intensity values.

On the basis of the histogram, the intensity value at which the ratio between the number of pixels in lower intensities and the number of pixels in higher intensities matches a predetermined value is determined as a threshold for binarization (step 65). Alternatively, the ratio between the number of the pixels forming edges of the vehicle ahead and the number of pixels of the processing area 30 may be estimated beforehand, and the intensity value that corresponds to the estimated ratio and that is greater than a predetermined intensity value may be determined as the threshold for binarization.

With respect to the threshold, for example, the higher intensities are assigned 1, the lower intensities are assigned 0, thereby producing a binary image of the processing area 30 (step 67). The pixel having the value of 1 is referred to as an edge point.

There are a number of conventional methods for setting the threshold for binarization. The above method for setting the threshold is merely one example and is not meant to exclude another method.

Then, pixels having the value of 1, that is, edge points, are extracted. If two or more edge points continue, they are grouped into a horizontal edge. In the present embodiment, a labeling process using a template is used as a method for grouping edge points. The labeling process is described in detail in U.S. patent application Ser. No. 09/567,734, filed May 10, 2000, which is incorporated herein by reference.

With reference to FIGS. (9A) through 9(E), the labeling process is described below. FIG. 9 shows a template for the labeling process. T1 through T3 in FIG. 9(A) indicate positions in the template. V1 through V3 in FIG. 9(B) indicate the values (1 or 0) of pixels corresponding to the positions T1 through T3 respectively when the template is positioned such that T2 assumes the place of an edge point to be processed. L1 through L3 in FIG. 9(C) indicate labels assigned to pixels corresponding to the positions T1 through T3 respectively.

The table in FIG. 9(D) shows the type of label L2 that is assigned to the edge point at position T2 based on the value of the pixels at positions T1 through T3 when T2 is placed at the edge point to be processed. For example, if the values V1 through V3 at positions T1 through T3 satisfy condition 4 in FIG. 9(D), then a label L1 is assigned to the edge point at T2. The label L is assigned when the condition 1 is satisfied requiring a new label. A horizontal edge extraction part 7 successively scans the edge points placing T2 of the template at respective edge points, thus assigning label L2 to respective edge points, as shown in FIG. 9(E).

The process of assigning labels to respective edge points is described more specifically with reference to FIGS. 10(A) through 10(C). FIG. 10(A) is an example of a part of the image after binarization, wherein the value of 0 is represented by a dot. The template is placed such that position T2 of the template is at respective edge points, each of which having the value of 1. FIG. 10(B) shows the image after assigning labels to respective edge points. As seen in FIG. 10(B), the same labels are assigned to the continuous edge points.

Here, referring to FIG. 9(D), when condition 5 is satisfied, labels corresponding to positions T1 and T3 are connected or joined together, and the label corresponding to T3 is replaced with the label corresponding to T1. In the example shown in FIG. 10(B), edge points 91 and 92, and edge points 92 and 93 satisfy condition 5. Therefore, all edge points having the labels D and E are re-assigned label C (see FIG. 10(C)). By connecting labels, all continuous edge points are integrated into an edge group assigned the same labels. FIG. 10(C) shows three edge groups with labels A, B and C. Thus, three horizontal edges are extracted.

In another embodiment, this process of connecting labels is performed after scanning all edge points in the processing area 30 and assigning labels to them.

Figures 10, 11:
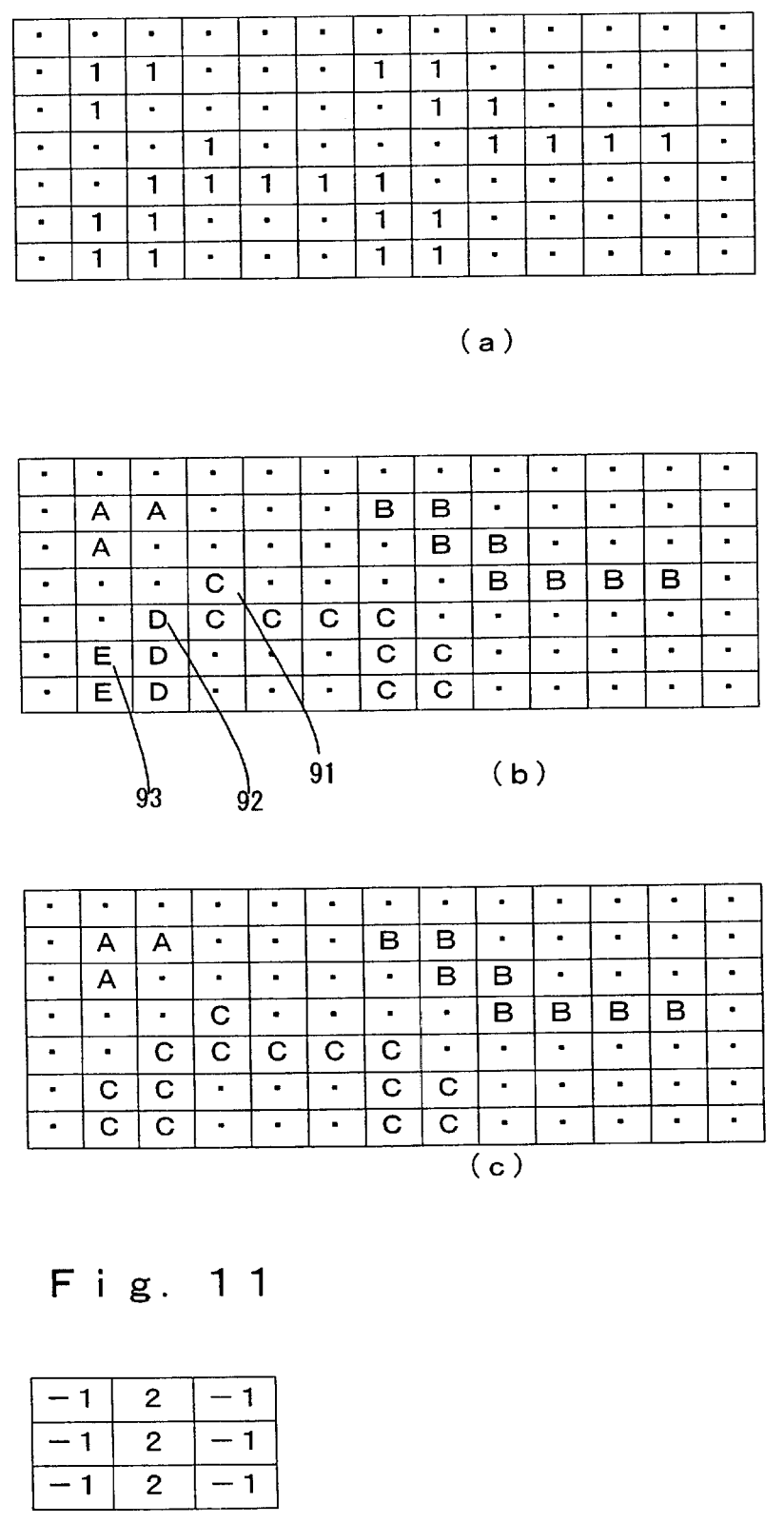

The vertical edge extraction part 9 extracts vertical edges from the processing area 30 in the same way as the horizontal edge extraction part 7 except that a vertical edge filter shown in FIG. 11 is used in step 61 (FIG. 6).

Judging Horizontal and Vertical Edges

Preferably, the horizontal and vertical edge extraction part 7 and 9 judges whether or not each of the extracted horizontal and vertical edges indicates or belongs to the object based on characteristics of the object to be recognized. In other words, each of the extracted edges is judged based on characteristics of the object when it is displayed in the image. In the present embodiment, since the object to be recognized is the vehicle ahead, the judgment is carried out based on characteristics, such as having a box-shape, having relatively a large number of horizontal edges, and having linear edges.

By way of example, the following judgment conditions are used to judge whether or not each of the extracted horizontal edges belongs to the vehicle ahead.

1) It is judged that an edge containing a pixel located on a boundary of the processing area belongs to an object other than the vehicle ahead. This is because the processing area is set to surround the vehicle ahead as described above.
2) The linearity of each of the extracted horizontal edges is examined, and it is judged that an edge having a poor linearity belongs to an object other than the vehicle ahead. This is because a horizontal edge belonging to the vehicle ahead does not draw a curve in the horizontal direction.
3) The slope of each of the extracted horizontal edges is examined, and it is judged that an edge having a large slope belongs to an object other than the vehicle ahead. This is because a horizontal edge belonging to the vehicle ahead does not have a large slope in the horizontal direction.

With reference to FIGS. 12(A) through 12(C), the above condition 1) through 3) will be described in detail below. FIG. 12(A) shows an example of the captured image. A marking on the road 120, a mountain ridge 130, and white lines 140 are included in the image. The marking 120 extends across the processing area 30. FIG. 12(B) shows a binary image of horizontal edges extracted for the image in FIG. 12(A). In this binary image, not only the edges belonging to the vehicle ahead 40, but also edges 125 and 126 belonging to the marking 120, edges 135 through 137 belonging to a part of the mountain ridge 130, and edges 145 and 146 belonging to the white lines 140 are included.

For the above condition 1), the horizontal edge extraction part 7 examines x coordinates of the pixels forming each of the horizontal edges to judge whether the x coordinates include edge point having Xa1 or Xa2. The processing area 30 is specified by the coordinates (Xa1, Ya1) and (Xa2, Ya2) as described above. Therefore, if the x coordinates include the edge point having Xa1 or Xa2, then it is judged that the horizontal edge extends across the boundary of the processing area 30, and that the horizontal edge belongs to an object other than the vehicle ahead. In the example shown in 12(B), since the edge 125 and 126 contain pixels having the x coordinates Xa1 and Xa2, each of the edges 125 and 126 is judged to belong to an object other than the vehicle ahead.

For the above condition 2), the horizontal edge extraction part 7 calculates a variance of y coordinates of the edge points forming each of the extracted horizontal edges. If the variance is larger than a predetermined value, then it is judged that the horizontal edge belongs to an object other than the vehicle ahead. In the example shown in FIG. 12(B), each of the edges 135 through 137 having poor linearity is judged to belong to an object other than the vehicle ahead.

For the above condition 3), the horizontal edge extraction part 7 approximates each of the extracted horizontal edges by straight lines in accordance with a conventional manner such as the least-squares method, to examine the slope of the edge approximated by straight lines. If the slope is larger than a predetermined value, it is judged that the horizontal edge belongs to an object other than the vehicle ahead. In the example shown in FIG. 12(B), each of the edges 145 and 146 having a large slope is judged to belong to an object other than the vehicle ahead.

Horizontal edges judged to belong to the vehicle ahead and horizontal edges judged to belong to an object other than the vehicle ahead are stored separately in a horizontal edge memory 12. For example, the edge points forming the horizontal edges judged to belong to the vehicle ahead are stored with value 1, and the edge points forming the horizontal edge judged to belong to an object other than the vehicle ahead are stored with value zero. Alternatively, a flag may be set only for the edge points forming the horizontal edges judged to belong to an object other than the vehicle ahead, and these edge points are stored with the flag so that the edges cannot be used in subsequent processes. FIG. 12(C) shows a binary image of horizontal edges after removing the edges 125, 126, 135, 136, 137, 145, and 146.

Horizontal edges containing a pixel on a boundary of the processing area may originate from a building in the background and a marking on the road such as a stop line. Horizontal edges having a poor linearity may originate from natural objects such as a tree, and a flag used as a signboard of a shop. Horizontal edges having a large slope may originate from a guardrail, a sign of no-passing lane, and a roadside structure. According to the above process, erroneous recognition of the vehicle ahead can be avoided by judging horizontal edges based on the characteristics of the vehicle ahead.

One or more of the judgment conditions 1) through 3) may be used. Furthermore, another judgment condition can be used. The characteristics can be changed depending on the type of an object to be recognized, such as the size, shape, and outline of the object.

A vertical edge extraction part 9 judges whether or not each of the extracted vertical edges belongs to the vehicle ahead by the same way as the horizontal edge. Vertical edges judged to belong to the vehicle ahead and vertical edges judged to belong to an object other than the vehicle ahead are stored separately in a vertical edge memory 14.

Recognizing the Outline of the Object

Referring to FIG. 2 again, an object outline recognition part 15 recognizes the outline of the object based on edges judged to belong to the object and stored in the horizontal edge memory 12 and the vertical edge memory 14. According to the present embodiment, since the object to be recognized is the vehicle ahead, the object is displayed as a box-shape. Therefore, the outline of the object is recognized by determining the positions of the upper, lower, left, and right ends of the object. The process of recognizing the outline of the object will be described with reference to FIGS. 13 and 14.

Figure 13:
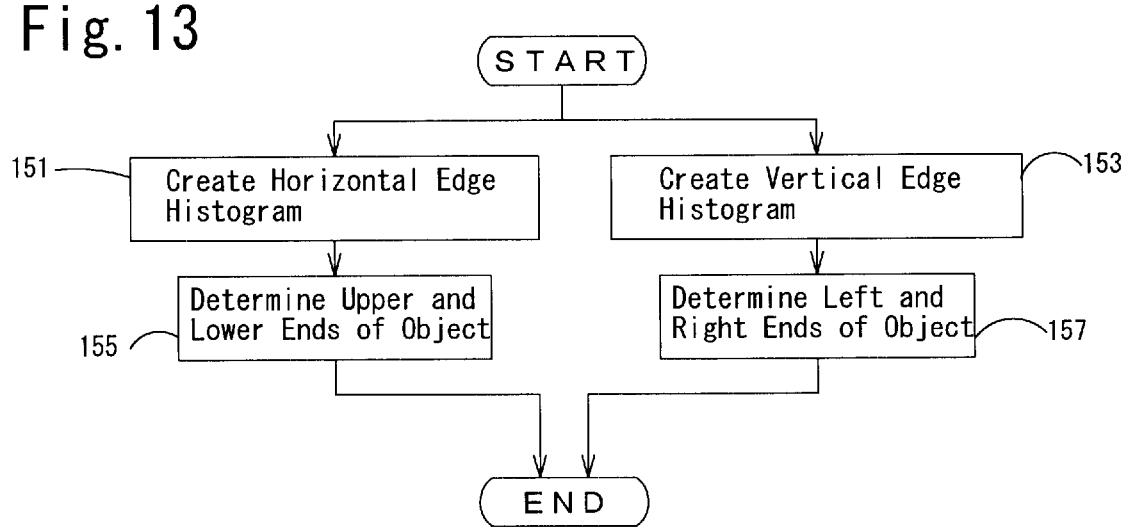
FIG. 13 is a flowchart of a method for recognizing the outline of an object in accordance with one embodiment of the invention.

FIG. 13 shows a flowchart of recognizing the outline of the object. FIG. 14(A) shows an example of a captured image. FIGS. 14(B) and (C) show a binary image showing horizontal and vertical edges extracted from the image in FIG. 14(A) and judged to belong to the vehicle ahead by horizontal and vertical extraction parts 7 and 9 respectively.

First, the object outline recognition part 15 creates a histogram for horizontal edges in FIG. 14(B), and a histogram for vertical edges in FIG. 14(C) (steps 151 and 153), as shown in FIG. 14(D) and FIG. 14(E) respectively. The histogram in FIG. 14(D) shows the number of the edge points forming the horizontal edge at each y coordinate in the processing area 30 while the histogram in FIG. 14(E) shows the number of the edge points forming the vertical edge at each x coordinate in the processing area 30.

Figure 14:
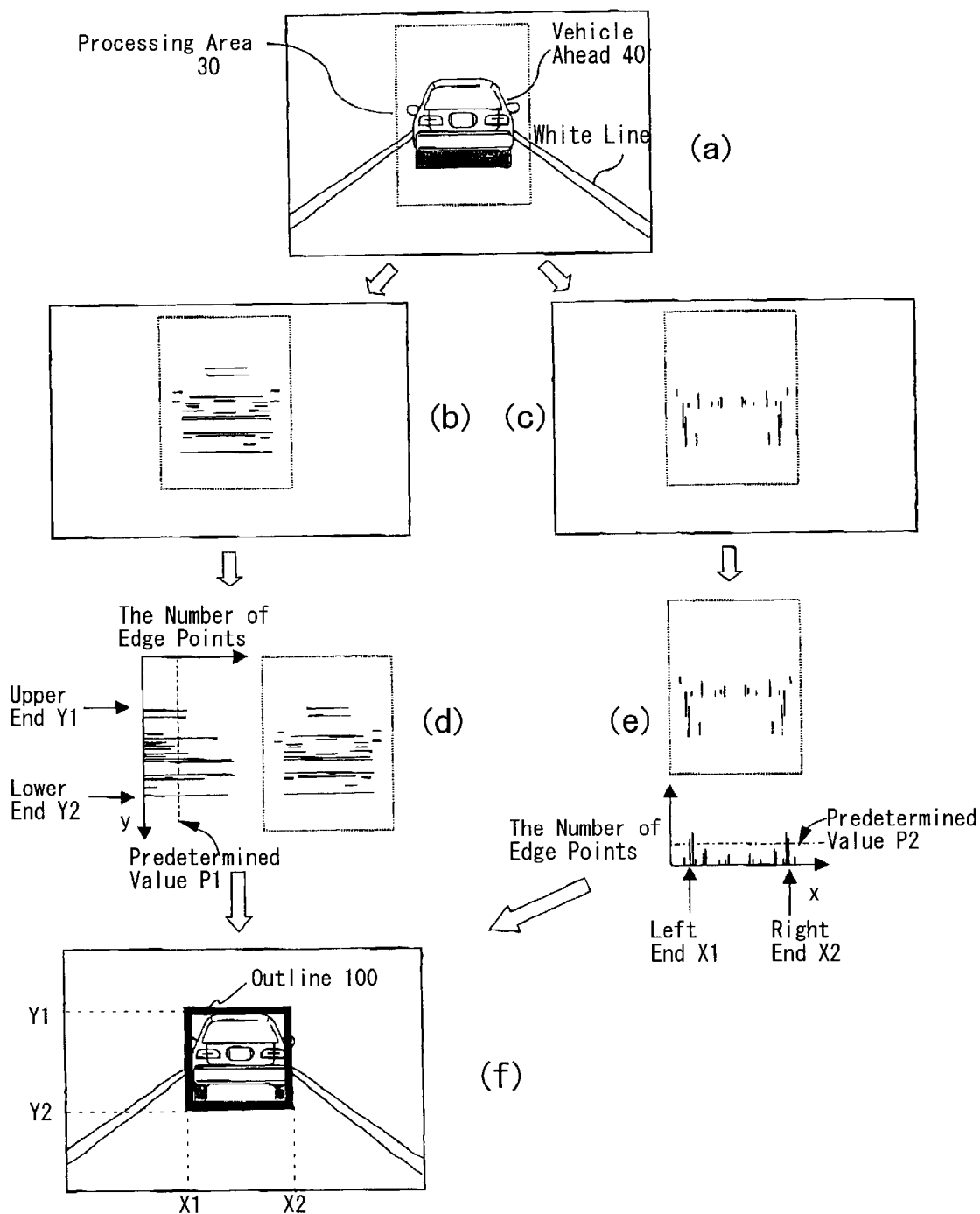
FIGS. 14a through 14f are a diagram showing the scheme for recognizing the outline of the object in accordance with one embodiment of the present invention.

The object outline recognition part 15 determines the positions of the upper and lower ends of the vehicle ahead based on the horizontal edge histogram in FIG. 14(D) (step 155 in FIG. 13), and determines the positions of the left and right ends based on the vertical edge histogram in FIG. 14(E) (step 157 in FIG. 13). More specifically, an upper and a lower horizontal edges are identified from the histogram in FIG. 14(*d*). The upper horizontal edge is the horizontal edge in which the number of edge points included is larger than a predetermined value P1, and which is closest to the upper boundary Ya1 of the processing area 30. The lower horizontal edge is the horizontal edge in which the number of edge points included is larger than the predetermined value P1, and which is closest to the lower boundary Ya2 of the processing area 30. The y coordinate Y1 corresponding to the upper horizontal edge is determined as the upper end of the vehicle ahead while they coordinate Y2 corresponding to the lower horizontal edge is determined as the lower end. In addition, a left and a right vertical edges are also identified from the histogram in FIG. 14(E). The left vertical edge is the vertical edge which is located near the left boundary Xa1 of the processing area 30, and in which the number of edge points included is larger than a predetermined value P2. The right vertical edge is the vertical edge which is located near the right boundary Xa2 of the processing area 30, and in which the number of edge points included is larger than the predetermined value P2. The x coordinate X1 corresponding to the left vertical edge is determined as the left end of the vehicle ahead while the x coordinates X2 corresponding to the right vertical edge is determined as the right end. Thus, as shown in FIG. 14(F), the positions of the upper, lower, left, and right ends of the vehicle ahead 40 are determined, thereby recognizing the outline 100 of the vehicle ahead 40.

In another embodiment, only horizontal edges may be extracted from the processing area to judge whether each of the extracted horizontal edges belongs to the object, determining the positions of the upper, lower, left and right ends of the object based on the horizontal edges judged to belong to the object. In this case, the longest horizontal edge between the upper and lower ends may be selected, and then the x coordinates corresponding to the left and right ends of the longest horizontal edge may be determined as the positions of the left and right ends of the object respectively. When the object is the vehicle ahead, a comparatively large number of horizontal edges can be extracted. Therefore, the outline of the vehicle ahead can be recognized based on the horizontal edges only.

Recognizing Lane Lines

Referring to FIG. 1 again, a lane line detection part 23 detects lane lines of the vehicle mounting the system of the invention from the captured image stored in the image memory 2. In the present embodiment, the lane lines are defined as lines delimiting the lane in which the vehicle mounting the system of the invention is running from other lanes.

In the present embodiment, the lane lines of the vehicle are recognized by detecting the road area corresponding to the lane in which the vehicle is running. The method for detecting the road area is described in U.S. patent application Ser. No. 09/534,349, filed Mar. 24, 2000, which is incorporated herein by reference. However, the method for detecting lane lines may be implemented using any conventional methods. For example, the lane lines may be recognized by detecting two white lines between which the vehicle is running.

Figure 15:
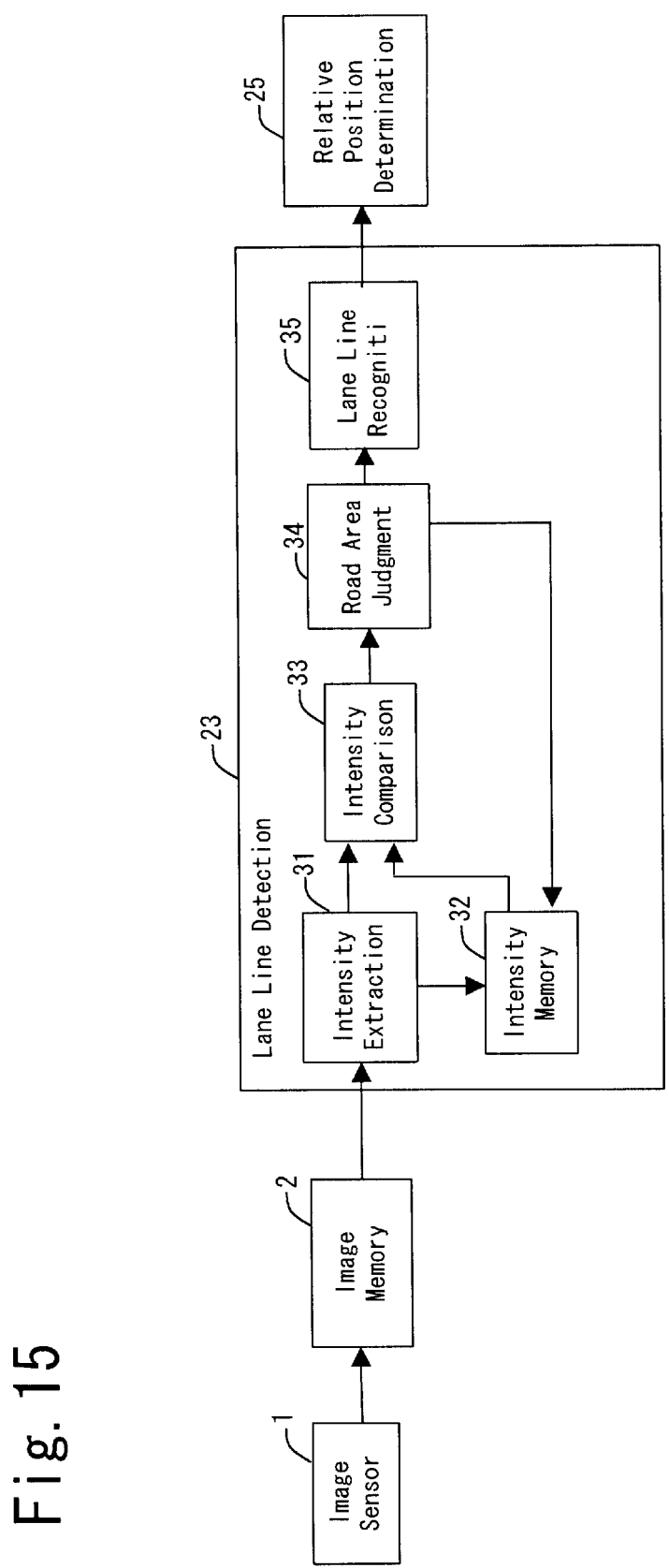
FIG. 15 is a block diagram illustrating in detail the lane line detection part in accordance with one embodiment of the present invention.
Figure 16:
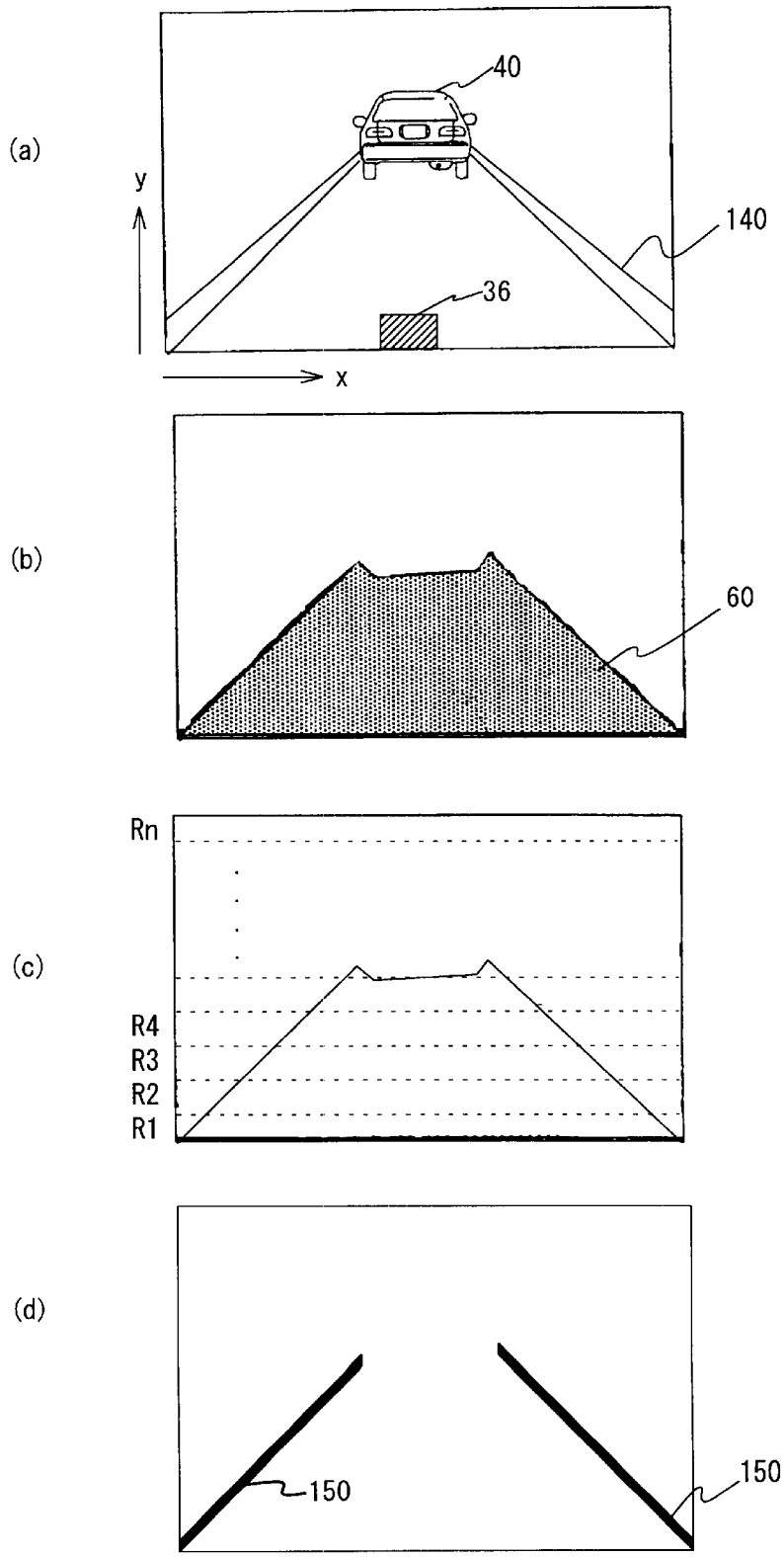
FIGS. 16a through 16d are a diagram showing the scheme for detecting the lane lines.

The method for detecting the road area within a captured image in accordance with the method disclosed in the above application will be described below by referring to FIGS. 15 and 16. FIG. 15 is a block diagram illustrating in detail the lane line detection part 23. FIG. 16(A) shows an example of a captured image in which the vehicle ahead 40 and lane lines 140 are included. For convenience in computation, the y-axis is fixed in the vertical direction and the x-axis is fixed in the horizontal direction to represent the position of each of pixels within the image by x and y coordinates.

As described above, the image captured by the image sensor 1 is converted into digital data and stored in the image memory 2. An intensity extraction part 31 extracts a plurality pixels contained in an area 36 immediately in front of the vehicle from the image memory 2, and obtains intensity values of the extracted pixels. The intensity values for the area immediately in front of the vehicle are first used because it is highly likely that the area directly in front of the vehicle belongs to the surface of the road.

In order to extract an intrinsic intensity value of the road, pixels corresponding to markings on the road surface need to be excluded. When the area 36 includes pixels belonging to markings on the road surface, a fluctuation exists in the intensity values of the pixels in the area 36 because the intensity of markings is substantially different from the intensity of the road. To eliminate undesirable pixels, the intensity values of the pixels in the area 36 are averaged and pixels having the intensity values that are significantly different from the mean value are excluded.

In one embodiment, since markings on the road surface are mainly colored white or yellow and are substantially different in color from the road, it is possible to exclude pixels having intensity values in the color range of white and yellow.

In another embodiment, whether or not an intensity value extracted from a currently input image is the intrinsic intensity value of the road can be decided based on a reference intensity value extracted from previously input images and determined to belong to road.

After the intensity values of pixels corresponding to markings on the road surface have been excluded, the intensity extraction part 31 determines a reference intensity value by averaging intensity values of the remaining pixels in the area 36 and stores the reference intensity value in an intensity memory 32. The intensity values are expressed digitally with 256 gradations (ranging from pure black "0" to pure white "255").

Alternatively, a plurality of reference intensity values may be determined each for a specific portion of the area. For example, the area 36 may be divided into four parts and the reference intensity value may be determined for each part.

Next, the intensity extraction part 31 extracts the intensity value of another pixel other than the pixels within the area 36 and passes it to the intensity comparison part 33, which compares the extracted intensity value with the reference intensity value stored in the intensity memory 32.

The road area judgment part 34 judges a road area based on the comparison results passed from the intensity comparison part 33. If the difference in the intensity values is within a predetermined range (for example, a range having the reference intensity value ±3 may be used), the pixel in question is judged to belong to the road area. If the difference in the intensity values is not within the predetermined range, the pixel in question is determined to belong to a different physical object or to a marking on the road. This is because the intensity values of pixels belonging to the road area are similar each other, but are different from the intensity values of pixels belonging to the vehicle ahead or a white line. The intensity value of the pixel judged to be the road area is stored in the intensity memory part 32 as a new reference value.

The road area judgment part 34 sequentially scans pixels within the captured image while performing the above comparing and judging processes. The direction for scanning may be arbitrarily set, but it is preferable that the pixel selected next by the intensity extraction part 31 is close to the pixel having the reference intensity value. This is because the intensity values of two pixels, which actually belong to the road area, may be substantially different when the distance between these pixels is large. In the present embodiment, pixels in the image are scanned from bottom to top, from left to right sequentially. Thus, the road area can be correctly detected even if the intensity of the road changes depending on the distance from the vehicle. FIG. 16(B) shows the road area 60 thus detected.

In one embodiment, the road area is determined by using one or more intensity values initially extracted from pixels corresponding to the area immediately in front of the vehicle as fixed reference intensity values. In this case, the intensity values of pixels in the image are compared with these reference intensity values respectively.

In another embodiment, the captured image is divided into a plurality of windows, and an intensity value is extracted for each window. In this case, instead of using the intensity value of a pixel, intensity value of a window is used to detect the road area.

Further, in another embodiment, the range of intensity values representing the road area is determined based on the initially extracted reference intensity values. In this case, a pixel having the intensity value within the range is judged to belong to the road area. Thus, the captured image may be converted to a binary image wherein one of the binary values indicates the road area and the other indicates an object other than the road area.

In another embodiment, the area surrounded by the pixels that have been judged to belong to the road area can be automatically judged to belong to the road area. For example, for a predetermined size of an image area, if the ratio of the number of pixels determined to belong to the road area is larger than a predetermined value, then the entire image area may be determined to belong to the road area.

Then, a lane line recognition part 35 recognizes lane lines of the lane in which the vehicle mounting the system of the invention is traveling. The process of recognizing the lane lines will be described below in detail.

According to the present embodiment, pixels belonging to the lines partitioning the detected road area are extracted. These pixels correspond to edge points in which there is a difference in intensity between the intensity value representing an object other than the road area and the intensity value representing the road area. Thus, the outline of the road area 60 is extracted as shown in FIG. 16(C) by scanning the image in FIG. 16(B) while extracting edge points.

It is preferable that the extracted edge points are approximated by straight lines and then represented by a function of x and y. In the present embodiment, the captured image is divided into n ranges R1 to Rn in the y direction as shown in FIG. 16(C), and edge points are approximated by straight lines (or a curve) for each range, for example, in accordance with the Hough transformation which is a well-known method. Prior to the approximation, a labeling process as described above may be performed on the extracted edge points to obtain an edge group consisting of continuous edge points. In this case, the above linear approximation may be performed on each edge group.

Among the lines derived from edges by the approximation, continuous lines in the y-axis direction across a plurality of ranges are recognized as the lane line of the vehicle. If a lane line of other vehicles is recognized, then, based on the position of the image sensor 1 of the vehicle, two adjacent lines closest to either sides of the vehicle are recognized as the lane lines of the vehicle. Since lines representing a marking such as a sign of a speed limit or a part of the vehicle ahead are not continuous in the y-axis direction over a plurality of ranges, erroneous recognition that these lines are the lane lines of the vehicle can be avoided. Thus, the lane lines of the vehicle are correctly detected. FIG. 16(D) shows the recognized lane lines 150 of the vehicle. Each of the lane lines is represented as a function of x and y coordinates.

Figure 17:
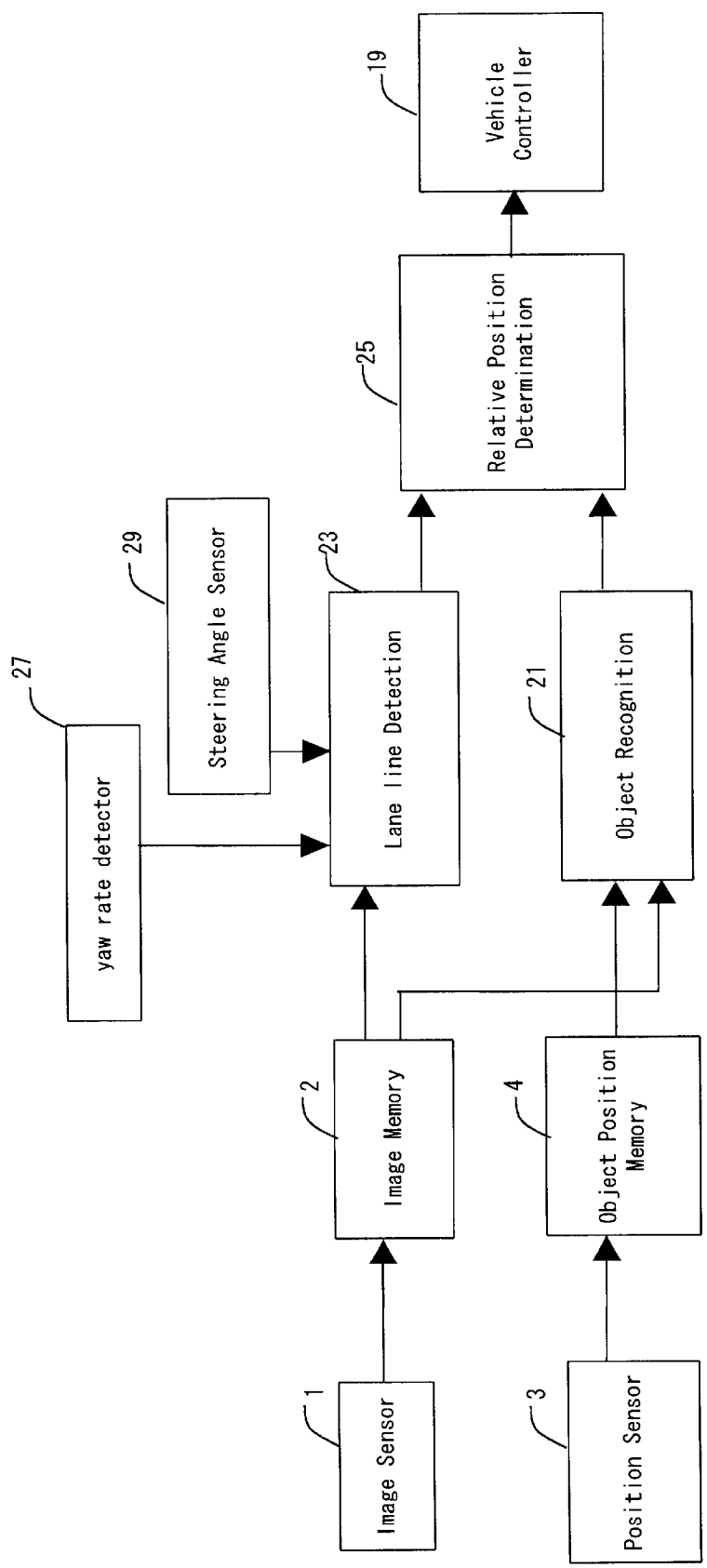
FIG. 17 is a block diagram illustrating the overall structure, and functional blocks of the controller of another embodiment of the present invention.

Since it may be difficult to detect the lane lines of the vehicle depending on the environment in which the image is captured, it is preferable that a yaw rate detector 27 and a steering angle sensor 29 are provided as shown in FIG. 17. In this embodiment, a lane line detection part 23 may take data regarding the behavior of the vehicle detected therefrom into account, and recognize the lane lines of the vehicle.

The above method for recognizing the lane lines of the vehicle is merely an example and is not meant to exclude another method. For example, there is a method for recognizing white lines by preparing a plurality of templates representing various shapes of white lines, performing a correlation operation on a captured image and the templates, and recognizing white lines based on whether the correlation value is smaller than a predetermined value. In another method, a captured image is converted to a binary image based on intensity values to detect edge points, and an area having the width from one edge point to the other edge point smaller than a predetermined value is recognized as a white line. Any of the applicable methods may be used.

Determining the Relative Position

Referring to FIG. 1 again, a relative position determination part 25 determines the relative position of the vehicle ahead to the lane lines of the vehicle mounting the system of the invention based on the positions of the lane lines determined by the lane line detection part 23 and the object outline determined by the object recognition part 21. Thus, the relative position determination part 25 judges whether the object is outside or inside the lane line of the vehicle, or is traversing the lane line.

Figure 18:
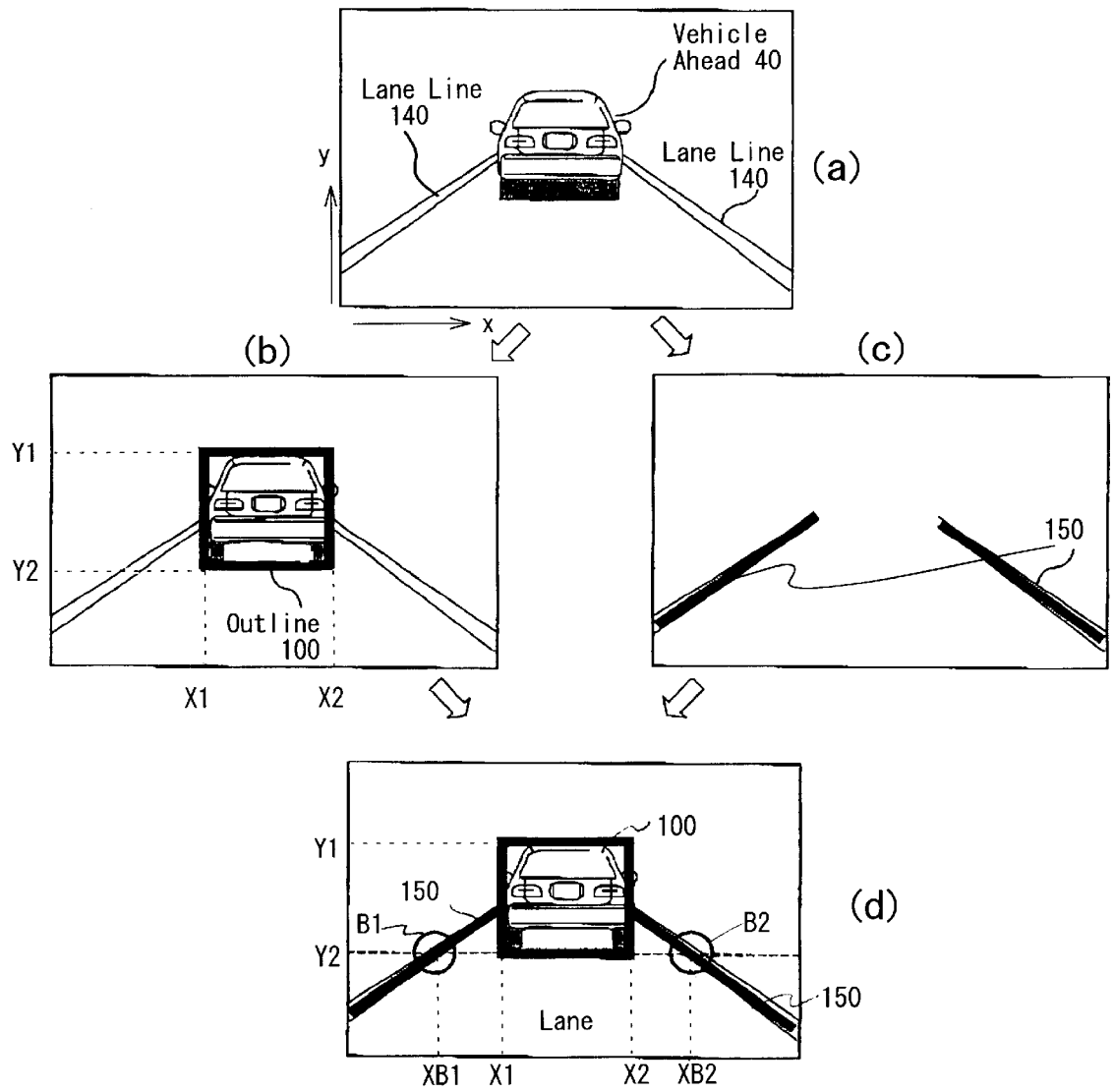
FIGS. 18a through 18d are a diagram showing the scheme for determining the relative position of the object to the lane lines of the vehicle mounting the system of the invention in accordance with one embodiment of the invention.

With reference to FIGS. 18(A) through 18(D), a method for determining the relative position of the vehicle ahead to the lane lines will be described. FIG. 18(A) shows an image captured by the image sensor 1, in which a vehicle ahead 40 and lane lines 140 are included. As shown in FIG. 18 (A), the x and y axes are fixed for the image. In FIG. 18(B), the black rectangle surrounding the vehicle ahead 40 indicates the outline 100 determined by the object recognition part 21. As described above, the outline 100 specify Y1, Y2, X1, and X2, which are the positions of the upper, lower, left, and right ends of the vehicle ahead 40 respectively. In FIG. 18(C), the bold lines indicate the lane lines 150 determined by the lane line detection part 23. Each of the lane lines 150 is represented as a function of x and y.

FIG. 18(D) shows the relationship between the outline 100 of the vehicle ahead 40 and the lane line 150. The relative position determination part 25 determines the intersections B1 and B2 between the horizontal line corresponding to Y2 and each of the lane lines 150 respectively. The coordinates of the determined intersections are defined as (XB1, Y2) and (XB2, Y2) respectively. The relative position determination part 25 then compares the positions in horizontal direction of the intersections XB1 and XB2 with the positions of the left end X1 and right end X2 of the vehicle ahead 40. If $X1 \geq XB1$ and $X2 \leq XB2$, then the relative position determination part 25 judges that the vehicle ahead 40 is within the lane of the vehicle. The rule for determining the relative position of the vehicle ahead to the lane lines is shown in Table 1.

TABLE 1

| Relationship between left and right ends of the vehicle ahead and the intersections | Relative position of the vehicle ahead to the lane lines |
| --- | --- |
| X2 < XB1 | The vehicle ahead is outside the left lane line |
| X1 < XB1 AND XB1 < X2 | The vehicle ahead is traversing the left lane line |
| X1 ≥ XB1 AND X2 ≤ XB2 | The vehicle ahead is between the left and right lane lines |
| X1 < XB2 AND X2 > XB2 | The vehicle ahead is traversing the right lane line |

TABLE 1-continued

| Relationship between left and right ends of the vehicle ahead and the intersections | Relative position of the vehicle ahead to the lane lines |
| --- | --- |
| X1 > XB2 | The vehicle ahead is outside the right lane line |

FIG. 19(A) shows an example of the relative position of the vehicle ahead to the lane lines in accordance with the invention. The outline 100 of the vehicle ahead is indicated by a black rectangle, and the lane lines 150 are indicated by bold oblique lines. The vehicle ahead is actually running across the left lane line. The relative position determination part 25 determines the intersections B1 and B2 between the left and right lane lines 150 and the horizontal line corresponding to the lower end Y2 of the vehicle ahead, respectively. The relative position determination part 25 then compares the left and right ends X1 and X2 of the outline 100 with the x coordinates XB1 and XB2 of the intersections B1 and B2 to determine the relative position of the vehicle ahead to the lane lines. In this example, since X1<XB1 and XB1<X2, it is judged that the vehicle ahead is running across the left lane line.

For the purpose of comparison, FIG. 19(B), which is the same image as FIG. 19(A), shows the relative position of the vehicle ahead to the lane lines in accordance with a conventional method using a radar apparatus. As seen in FIG. 19(B), the position of the vehicle ahead 40 can be obtained according to the position data 200 detected by the radar apparatus, but the size of the vehicle ahead cannot be obtained. Therefore, although the vehicle ahead 40 is actually running across the left lane line, it may be erroneously recognized as running outside the left lane line.

FIG. 20(A) shows another example of the relative position of the vehicle ahead to the lane lines determined in accordance with the invention. The outline 100 of the vehicle ahead is indicated by the black rectangle, and the lane line 150 is indicated by bold oblique lines. A motorbike 40, that is, the vehicle ahead, is actually running outside the left lane line. The relative position determination part 25 determines the intersections B1 and B2 between the left and right lane lines 150 and the horizontal line corresponding to the lower end Y2 of the vehicle ahead, respectively. The relative position determination part 25 then compares the left and right ends X1 and X2 of the outline 100 with the x coordinates XB1 and XB2 of the intersections B1 and B2 to determine the relative position of the vehicle ahead to the lane lines. In this example, since X2<XB1, it is judged that the vehicle ahead is running outside the left lane line.

Figure 20:
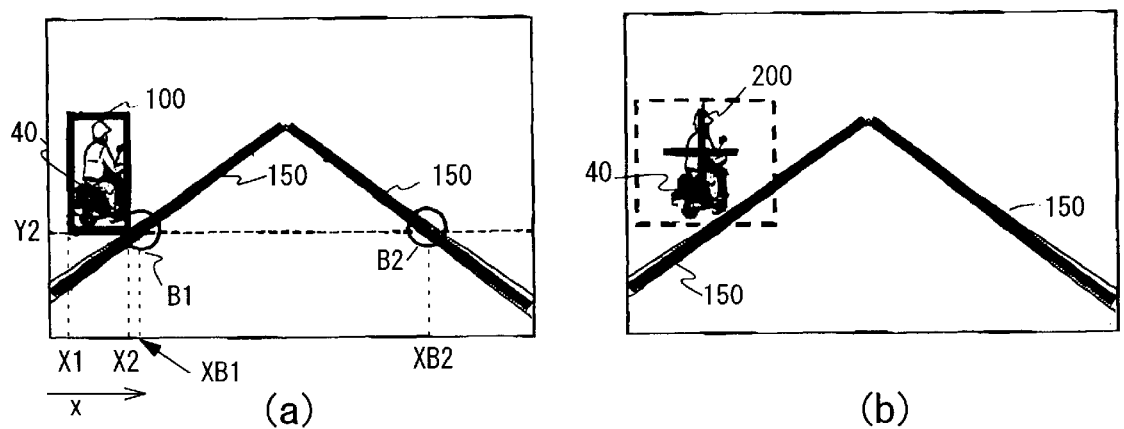
FIG. 20(A) shows another example the relative position of the object to the lane lines of the vehicle in accordance with one embodiment of the invention.
FIG. 20(B) shows the relative position in accordance with a conventional method.

For the purpose of comparison, FIG. 20(B), which is the same image as FIG. 20 (A), shows the relative position of the vehicle ahead to the lane lines in accordance with a conventional method using a radar apparatus. As seen in FIG. 20(B), the position of the vehicle ahead 40 can be obtained according to the position data 200 detected by the radar apparatus, but the size of the vehicle ahead cannot be recognized. Therefore, when the predetermined size for the vehicle ahead to be recognized is stored beforehand as indicated by the rectangle with dotted lines as shown in FIG. 20(B), the vehicle ahead may be erroneously recognized as running across the lane line.

Thus, since the object recognition system according to the present invention recognizes the outline of the object, the relative position of the object to the lane lines can be correctly recognized. Accordingly, the object running close to the lane line can be correctly recognized as running outside the lane line, running inside the lane line, or running across the lane line. Furthermore, the timing of the object entering to and exiting from the lane line can be correctly detected.

Referring to FIG. 1 again, the relative position determined by the relative position determination part 25 is passed to a vehicle controller 19, which controls the operation of the vehicle mounting the system of the invention according to the received relative position. For example, when the vehicle ahead enters the lane line of the vehicle, the driver may be notified of the entrance by a warning voice message, a warning lamp, or a warning beep. If the distance to the vehicle ahead is smaller than a predetermined value, then the engine of the vehicle mounting the system of the invention may be controlled to forcibly decelerate.

Each of the processing area setting part 5, the horizontal edge extraction part 7, the vertical edge extraction part 9, the horizontal edge memory 12, the vertical edge memory 14, the object outline recognition part 15, the intensity extraction part 31, the intensity comparison part 33, the road area determination part 34, the lane line recognition part 35, the relative position determination part 25, the vehicle controller 19, the image memory 2, the object position memory 4, and the intensity memory 32 shown in FIGS. 1, 2, 15, and 17 can be implemented by a micro-controller which typically includes a central processing part (CPU), a read-only memory storing control programs and data, and a random-access memory (RAM) providing a working area for the CPU and temporary storage for various data. In other words, computer programs stored in the ROM implements the above-described functions of the functional blocks shown in FIG. 1.

The image memory 2, the object position memory 4, the horizontal edge memory 12, the vertical edge memory 14, and the intensity memory 32 may also be implemented using different memory areas of a single RAM. Temporary storage areas for data required in various types of operations may also be provided by portions of the same RAM.

The object recognition system according to the present invention may be LAN-connected to an engine electronic control part (ECU), brake-control part and other ECU, and the output from this object recognition system may be used for overall control of the vehicle.

Thus, according to the invention, the relative position of the object to the lane lines can be correctly determined by recognizing the outline of the object.

Although particular embodiments of the invention have been described in detail, it should be appreciated that the alternatives specifically mentioned above and many other modifications, variations, and adaptations may be made without departing from the scope of the invention as defined in the claims.

What is claimed is:

1. An object recognition system comprising:
a radar for determining a position of an object;
an image sensor for capturing an image of the object; and
a controller programmed to position a processing area within the image captured by the image sensor with respect to the position of the object determined by the radar, to recognize the outline of the object based on edges extracted from the processing area, to recognize lane lines defining a lane in which the vehicle mounting the system is running, and to determine a relative position of the object to the lane lines based on the outline of the object and the recognized lane lines, wherein the size of the processing area is predetermined to adapt to a possible width and height of the object to be recognized.

2. The system of claim 1, wherein the outline of the object is recognized by determining upper, lower, left, and right ends of the object.

3. The system of claim 2, wherein the relative position is determined by comparing the intersections between a horizontal line corresponding to the lower end of the object and the lane lines with the left and right ends of the object.

4. The system of claim 3, wherein the edges comprises horizontal edges and vertical edges.

5. The system of claim 4, wherein the upper and lower ends of the object are determined from the horizontal edges, and the left and right ends of the object are determined from the vertical edges.

6. The system of claim 1, said controller is further programmed to detect a road area by examining a change in intensity for pixels within the image; and
wherein the lane lines are determined from an outline of the detected road area.

7. The system of claim 1, wherein the size of the processing area is predetermined allowing for a margin.

8. The method for recognizing an object comprising steps of:
determining a position of the object;
capturing an image of the object;
positioning a processing area within the image with respect to the determined position of the object;
extracting edges from the processing area;
recognizing an outline of the object based on the extracted edges;
recognizing lane lines defining a lane in which the vehicle implementing the method is running; and
determining a relative position of the object to the lane lines based on the recognized outline of the object and the recognized lane lines,
wherein the size of the processing area is predetermined to adapt to a possible width and height of the object to be recognized.

9. The method of claim 8, further comprising a step of determining upper, lower, left, and right ends of the object; and
wherein the outline of the object is recognized by determined upper, lower, left, and right ends of the object.

10. The method of claim 9, further comprising a step of comparing the intersections between a horizontal line corresponding to the lower end of the object and the lane lines with the left and right ends of the object; and
wherein the relative position is determined based on the result of the comparison.

11. The method of claim 10, wherein the edges comprises horizontal edges and vertical edges.

12. The method of claim 11, wherein the upper and lower ends of the object are determined from the horizontal edges, and the left and right ends are determined from the vertical edges.

13. The method of claim 12, further comprising a step of judging whether each of the extracted horizontal and vertical edges belongs to the object based on characteristics of the object to be recognized; and
wherein the step of recognizing the outline of the object is performed on the horizontal and vertical edges judged to belong to the object.

14. The method of claim 8, further comprising a step of detecting a road area by examining a change in intensity for pixels within the image; and
wherein the lane lines are determined from an outline of the detected road area.

15. An object recognition system comprising:

a radar for determining a position of an object;

an image sensor for capturing an image of the object;

means for positioning a processing area within the image with respect to the position determined by the radar;

means for extracting edges from the processing area;

means for recognizing an outline of the object based on the extracted edges;

means for recognizing lane lines defining a lane in which the vehicle mounting the system is running; and means for determining a relative position of the object to the lane lines based on the recognized outline of the object and the recognized lane lines, wherein the size of the processing area is predetermined to adapt to a possible width and height of the object to be recognized.

16. The system of claim 15, wherein the outline of the object is recognized by determining upper, lower, left, and right ends of the object.

17. The system of claim 16, wherein the relative position is determined by comparing the intersections between a horizontal line corresponding the lower end of the object and the lane lines with the left and right ends of the object.

18. The system of claim 17, wherein the edges comprises horizontal edges and vertical edges.

19. The system of claim 18, wherein the upper and lower ends are determined from the horizontal edges, and the left and right ends are determined from the vertical edges.

20. The system of claim 15, further comprising means for detecting a road area by examining a change in intensity for pixels within the image; and wherein the lane lines are determined from the outline of the detected road area.

* * * * *